United States Patent
Pfau (10) Patent No.: US 11,364,906 B2
(45) Date of Patent: Jun. 21, 2022

(54) CONTROL SYSTEM AND CONTROL METHOD FOR CONTROLLING BEHAVIOR OF MOTORCYCLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 170 days.

(21) Appl. No.: 16/770,058

(22) PCT Filed: Dec. 4, 2018

(86) PCT No.: PCT/IB2018/059603
§ 371 (c)(1),
(2) Date: Jun. 4, 2020

(87) PCT Pub. No.: WO2019/111140
PCT Pub. Date: Jun. 13, 2019

(65) Prior Publication Data
US 2020/0384994 A1 Dec. 10, 2020

(30) Foreign Application Priority Data
Dec. 6, 2017 (JP) .............................. JP2017-234052

(51) Int. Cl.
*B60W 30/14* (2006.01)
*G08G 1/16* (2006.01)
*G06V 20/56* (2022.01)

(52) U.S. Cl.
CPC ......... *B60W 30/143* (2013.01); *G06V 20/588* (2022.01); *G08G 1/166* (2013.01);
(Continued)

(58) Field of Classification Search
CPC ........... B60W 30/143; B60W 2300/36; B60W 2552/00; B60W 2720/10; B60W 2554/00;
(Continued)

(56) References Cited

U.S. PATENT DOCUMENTS

2009/0157286 A1   6/2009  Saito et al.
2015/0151725 A1*  6/2015  Clarke .................. B60W 10/18
                                                  701/28
(Continued)

FOREIGN PATENT DOCUMENTS

EP   3098799        11/2016
EP   3335953 A1 *   6/2018   .......... B62J 45/4151
JP   2009116882     5/2009

OTHER PUBLICATIONS

International Search Report for Application No. PCT/IB2018/059603 dated Feb. 28, 2019 (English Translation, 2 pages).

*Primary Examiner* — Jason Holloway
(74) *Attorney, Agent, or Firm* — Michael Best & Friedrich LLP (57) ABSTRACT

The present invention provides a control system and a control method capable of appropriately supporting driving of a motorcycle by a rider.

The control system includes a control amount setting unit that sets a control amount in auto cruise operation, an execution unit that causes the motorcycle to execute the auto cruise operation, and further including a lane position information acquiring unit that acquires relative position information of a lane boundary with respect to the motorcycle during traveling, and a limitation determining unit that determines to provide a limitation on the auto cruise operation in a case where a determination reference is satisfied, in which the determination reference includes a condition that the lane position information acquired by the lane position information acquiring unit satisfies a prescribed condition.

17 Claims, 5 Drawing Sheets

(52) U.S. Cl.
CPC ......... *G08G 1/167* (2013.01); *B60W 2300/36* (2013.01); *B60W 2552/00* (2020.02); *B60W 2720/10* (2013.01)

(58) Field of Classification Search
CPC ...... B60W 10/06; B60W 10/18; B60W 30/16; B60W 30/14; G06V 20/588; G08G 1/166; G08G 1/167; G08G 1/163
See application file for complete search history.

(56) References Cited

U.S. PATENT DOCUMENTS

| | | | |
|---|---|---|---|
| 2017/0144665 A1* | 5/2017 | Ohashi | B60W 30/16 |
| 2017/0291603 A1* | 10/2017 | Nakamura | B60W 30/095 |
| 2017/0327123 A1* | 11/2017 | Tokimasa | B60R 21/00 |
| 2017/0341647 A1 | 11/2017 | Rajvanshi et al. | |

* cited by examiner

CONTROL SYSTEM AND CONTROL METHOD FOR CONTROLLING BEHAVIOR OF MOTORCYCLE

BACKGROUND OF THE INVENTION

This disclosure relates to a control system and a control method capable of appropriately supporting operation of a motorcycle by a rider.

As a technique relating to a motorcycle (automobile bicycle or automobile tricycle) in the related art, there is a technique for supporting driving by a rider. For example, JP-A-2009-116882 discloses a driver support system that warns the rider of the motorcycle that inappropriately approaching an obstacle, based on an output of a detection device for detecting the obstacle in a traveling direction or substantially in the traveling direction.

SUMMARY OF THE INVENTION

Incidentally, in order to support the driving by the rider, it is conceivable to cause the motorcycle to execute auto cruise operation. In the auto cruise operation, the behavior of the motorcycle is controlled so that the traveling speed of the motorcycle approaches a speed reference value. In addition, in adaptive cruise operation serving as one aspect of the auto cruise operation, a preceding vehicle in a lane on which the motorcycle travels is specified as a tracking target vehicle, relative position information of the motorcycle and the tracking target vehicle is acquired, and behavior of the motorcycle is controlled so that a distance from the motorcycle to the tracking target vehicle approaches a distance reference value.

Here, regarding the auto cruise operation executed in a wide vehicle (for example, passenger car, truck or the like having four wheels), the auto cruise operation is already widely used, and various techniques are already established. However, compared to the wide vehicle, the motorcycle has a narrower vehicle width, and a degree of freedom of a traveling position in a width direction of the lane is large. Therefore, in the motorcycle, it is required to take into consideration traveling that is not supposed for the wide vehicle. As the traveling that is not supposed for the wide vehicle, for example, traveling on or in a vicinity of a lane boundary of two lanes adjacent to each other (so-called lane splitting) can be mentioned. That is, in order to appropriately support the driving of the motorcycle by the rider by the auto cruise operation, it is required to establish the technology from the viewpoint different from the auto cruise operation executed in the wide vehicle.

The present invention has been made in view of the above-described problem, and provides a control system and a control method capable of appropriately supporting driving of a motorcycle by a rider.

According to the present invention, there is provided a control system which controls behavior of a motorcycle, including a control amount setting unit that sets a control amount in auto cruise operation, an execution unit that causes the motorcycle to execute the auto cruise operation according to the control amount set by the control amount setting unit, a lane position information acquiring unit that acquires lane position information serving as relative position information of a lane boundary with respect to the motorcycle during traveling, and a limitation determining unit that determines to provide a limitation on the auto cruise operation in a case where a determination reference is satisfied, in which the determination reference includes a condition that the lane position information acquired by the lane position information acquiring unit satisfies a prescribed condition, and in a case where it is not determined to provide the limitation by the limitation determining unit, the execution unit causes the motorcycle to execute the auto cruise operation at a traveling speed according to the control amount, and in a case where it is determined to provide the limitation by the limitation determining unit, the execution unit prohibits the auto cruise operation, or causes the motorcycle to execute the auto cruise operation at a corrected traveling speed corrected to a lower traveling speed.

According to the present invention, there is provided a control method including a control amount setting step of setting a control amount in auto cruise operation, an execution step of causing the motorcycle to execute the auto cruise operation according to the control amount set in the control amount setting step, a lane position information acquiring step of acquiring a lane position information serving as relative position information of a lane boundary with respect to the motorcycle during traveling, and a limitation determining step of determining to provide a limitation on the auto cruise operation in a case where a determination reference is satisfied, in which the determination reference includes a condition that the lane position information acquired in the lane position information acquiring step satisfies a prescribed condition, and in the execution step, in a case where it is not determined to provide the limitation in the limitation determining step, the auto cruise operation in the motorcycle is executed at a traveling speed corresponding to the control amount, and in a case where it is determined to provide the limitation in the limitation determining step, the auto cruise operation is prohibited or the auto cruise operation in the motorcycle is executed at a corrected traveling speed corrected to a lower traveling speed.

In the control system and the control method according to the present invention, when the auto cruise operation is executed in the motorcycle, the relative position information of the lane boundary with respect to the motorcycle is acquired, and the auto cruise operation is inhibited based on the position information. That is, it is possible to inhibit the auto cruise operation in a situation where the motorcycle travels at a position unsuitable for the auto cruise operation. Therefore, it is possible to realize the appropriate auto cruise operation specialized in the motorcycle having a characteristic that a degree of freedom of the traveling position is large in the width direction of the lane.

DETAILED DESCRIPTION

Hereinafter, a control system and a control method according to the present invention will be described with reference to the drawings.

A term "motorcycle" means a motor bicycle or a motor tricycle among straddle-type vehicles on which riders straddle. In addition, in the following, a case where the motorcycle is the motor bicycle will be described, and the motorcycle may be the motor tricycle.

In addition, the configurations, processing, and the like described below are merely examples, and the control system and the control method according to the present invention are not limited to the case of such a configuration, processing, and the like. In addition, in the following, the same or similar description is simplified or omitted as appropriate. In addition, in each drawing, identical or similar members or portions are not provided with reference numerals or are given the same reference numerals. In addition, for the detailed structure, illustration is simplified or omitted as appropriate.

Embodiment 1

Hereinafter, a behavior control system according to Embodiment 1 will be described.

<Configuration of Behavior Control System>

The configuration of the behavior control system according to Embodiment 1 will be described.

Figure 1:
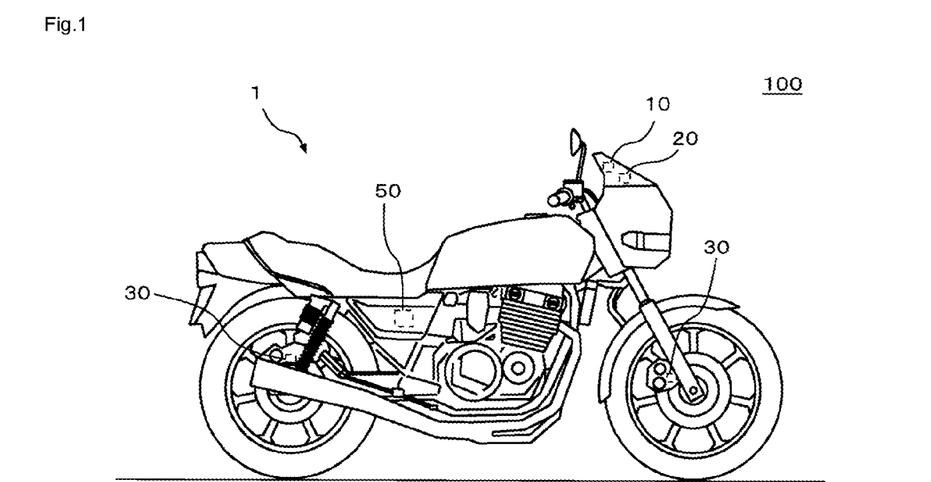
FIG. 1 is a diagram illustrating a mounting state in a motorcycle of a behavior control system according to Embodiment 1 of the present invention.
Figure 2:
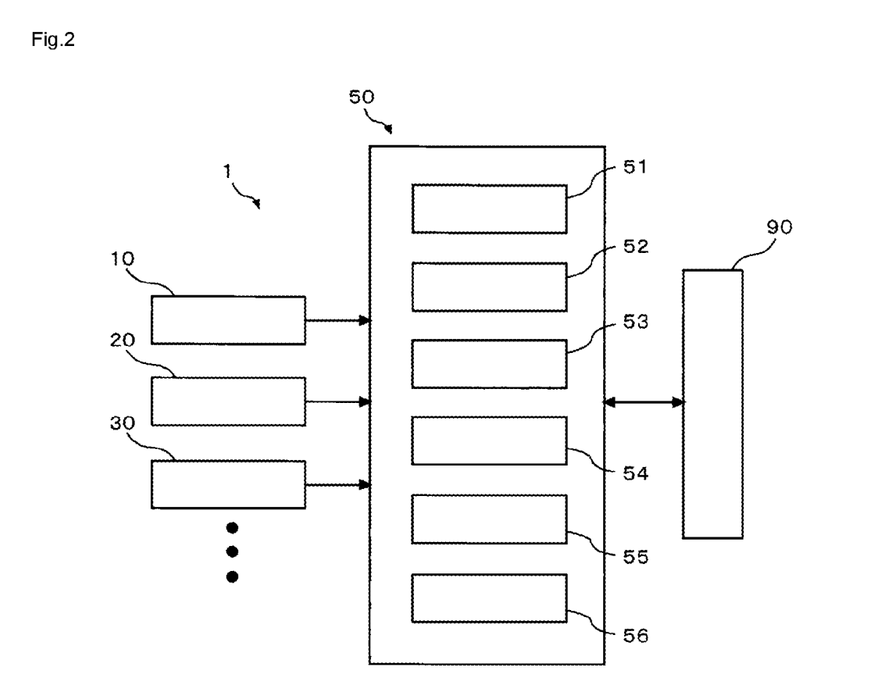
FIG. 2 is a diagram illustrating a system configuration of the behavior control system according to Embodiment 1 of the present invention.
Figure 3:
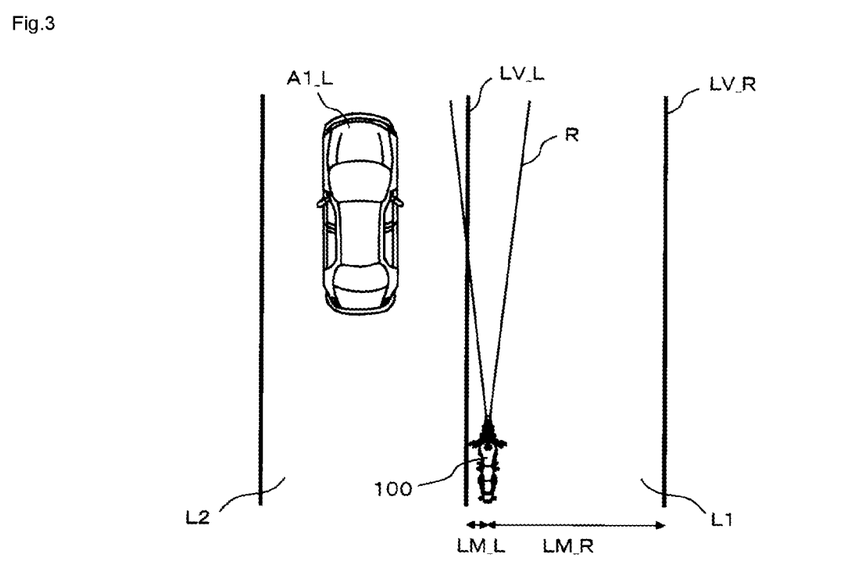
FIG. 3 is a diagram for describing processing of a control system of the behavior control system according to Embodiment 1 of the present invention.

FIG. 1 is a diagram illustrating a mounting state in a motorcycle of a behavior control system according to Embodiment 1 of the present invention. FIG. 2 is a diagram illustrating a system configuration of the behavior control system according to Embodiment 1 of the present invention. FIG. 3 is a diagram for describing processing of a control system of the behavior control system according to Embodiment 1 of the present invention.

As illustrated in FIG. 1, the behavior control system 1 is mounted on a motorcycle 100. The behavior control system 1 includes at least a distance measuring sensor 10 that receives reflection from a front of the motorcycle 100, an image sensor 20 that captures a traveling road surface of the motorcycle 100, a speed sensor 30 for recognizing the traveling speed of the motorcycle 100, and a control system (ECU) 50.

The distance measuring sensor 10 is attached to the front portion of the motorcycle 100 in a state facing forward. The distance measuring sensor 10 is, for example, a Radar sensor, a Lidar sensor, an ultrasonic sensor, a stereo vision sensor, or the like, and detects a distance and direction from the motorcycle 100 to an object located ahead of the motorcycle 100. The distance measuring sensor 10 may be other detection device capable of acquiring a traffic situation in front of the motorcycle 100, or may also have a function of the image sensor 20.

The image sensor 20 is attached to a front portion or a side portion of the motorcycle 100 in a state facing the traveling road surface. A detection range of the image sensor 20 is an area capable of capturing lane boundaries LV_R and LV_L on both sides defining a width direction of a traveling lane L1 on which the motorcycle 100 is traveling (refer to FIG. 3). The lane boundaries LV_R and LV_L on both sides may be captured by one image sensor 20 or may be captured by separate image sensors 20.

The speed sensor 30 is attached to a moving portion of the motorcycle 100. For example, the speed sensor 30 detects rotational speeds of a front wheel and a rear wheel of the motorcycle 100. The speed sensor 30 may be any sensor as long as the sensor can recognize the traveling speed of the motorcycle 100.

As illustrated in FIG. 2, the control system 50 includes a tracking target vehicle specifying unit 51, a vehicle position information acquiring unit 52, a control amount setting unit 53, a lane position information acquiring unit 54, a limitation determining unit 55, and an execution unit 56. Each of the units of the control system 50 may be provided collectively in one casing or may be divided into a plurality of casings. In addition, a portion or all of the control system 50 may be configured to include, for example, a microcomputer, a microprocessor unit, or the like, or may be configured to include updatable items such as firmware, or may be a program module or the like executed according to a command from a CPU.

Outputs of various sensors (distance measuring sensor 10, image sensor 20, speed sensor 30, and the like) are input to the control system 50. In addition, the control system 50 outputs a signal to a behavior control mechanism 90 to control behavior of the motorcycle 100. The behavior control mechanism 90 includes a wheel braking mechanism, an engine driving mechanism, and the like. That is, the control system 50 is a device that is responsible for controlling the behavior control mechanism 90 mounted on the motorcycle 100. A traveling direction of the motorcycle 100 is not automatically controlled, and varies depending on the operation of the motorcycle 100 by the rider.

The tracking target vehicle specifying unit 51 specifies a tracking target vehicle when the motorcycle 100 executes adaptive cruise operation, based on the output of the distance measuring sensor 10. Specifically, the preceding vehicle which is located on the lane L1 on which the motorcycle 100 is traveling, and has the shortest distance from the motorcycle 100 in the traveling direction of the motorcycle 100 among the preceding vehicles located within the detection range R (refer to FIG. 3) of the distance measuring sensor 10 is specified as the tracking target vehicle. Here, the characteristics (for example, width, direction, and the like) of the detection range R may be controllable or uncontrollable.

The vehicle position information acquiring unit 52 acquires vehicle position information serving as relative position information of the tracking target vehicle with respect to the motorcycle 100 during traveling, based on an output of the distance measuring sensor 10. Specifically, the distance from the motorcycle 100 to the tracking target vehicle in the traveling direction of the motorcycle 100 is acquired as the vehicle position information. The vehicle position information acquiring unit 52 may acquire the distance from the motorcycle 100 to the tracking target vehicle in the traveling direction of the motorcycle 100 by diverting the information acquired by the tracking target vehicle specifying unit 51.

The control amount setting unit 53 sets a control amount in the adaptive cruise operation, based on the vehicle position information acquired by the vehicle position information acquiring unit 52 and the output of the speed sensor 30. Specifically, the control amount setting unit 53 sets the control amount (speed, acceleration, and the like) such that the distance from the motorcycle 100 to the tracking target vehicle in the traveling direction of the motorcycle 100 approaches a distance reference value. The distance reference value is set to a value that can ensure the safety of the rider as the distance from the motorcycle 100 to the tracking target vehicle. In addition, the control amount setting unit 53 sets the control amount (speed, acceleration, and the like) such that the traveling speed of the motorcycle 100 does not exceed the speed reference value. The speed reference value can be appropriately set, for example, by the rider.

The lane position information acquiring unit 54 acquires the lane position information serving as the relative position information of the lane boundaries with respect to the motorcycle 100 during traveling, based on the output of the image sensor 20.

Specifically, in the situation illustrated in FIG. 3, the lane position information acquiring unit 54 acquires a lane margin LM_L related to the closest lane boundary LV_L from the motorcycle 100, based on the positions of the lane boundaries LV_R and LV_L in the image captured by the image sensor 20. The lane margin LM_L is defined as a distance from the motorcycle 100 to the lane boundary LV_L on the left side in the width direction of the lane L1. In a case where the lane boundary LV_R on the right side is closer to the motorcycle 100 than the lane boundary LV_L on the left side, the lane position information acquiring unit 54 acquires the lane margin LM_R defined as a distance from the motorcycle 100 to the lane boundary LV_R on the right side in the width direction of the lane L1.

The lane margins LM_R and LM_L may be defined as the distances from the image sensor 20 to the lane boundaries LV_R and LV_L, or it may also be defined as the distances from each portion of the motorcycle 100 to the lane boundaries LV_R and LV_L. In addition, the lane margins LM_R and LM_L may be defined as the distances from the motorcycle 100 to the center of the lane boundaries LV_R and LV_L, or it may also be defined as the distances from the motorcycle 100 to the edges of the lane boundaries LV_R and LV_L on the side closer to the motorcycle 100. In addition, the lane boundaries LV_R and LV_L may be defined as lane marks themselves, or it may also be defined as imaginary boundaries connecting two lane marks intermittently disposed side by side in the traveling direction of the motorcycle 100. In addition, the lane position information acquiring unit 54 may acquire other physical quantities that can be substantially converted into the lane margins LM_R and LM_L as the lane margins LM_R and LM_L. For example, the lane position information acquiring unit 54 may acquire other distances that can be substantially converted into the distance from the motorcycle 100 to the lane boundaries LV_R and LV_L in the width direction of the lane L1 as the lane margins LM_R and LM_L, or may acquire the number of pixels of the image sensor 20 as the lane margins LM_R and LM_L.

In a case where a determination reference is satisfied, the limitation determining unit 55 determines to set limitation on the adaptive cruise operation. The determination reference includes a condition that the lane position information acquired by the lane position information acquiring unit 54 satisfies a first prescribed condition. Specifically, in a case where the lane position information acquired by the lane position information acquiring unit 54 is information indicating a state where the lane margin LM_L is smaller than the reference value temporarily or over a period longer than the reference period, the limitation determining unit 55 determines to provide the limitation on the adaptive cruise operation. The reference value is set to a value at which the motorcycle 100 traveling by the adaptive cruise operation can safely travel next to the preceding vehicle A1_L traveling on the adjacent lane L2. The reference period is set to a period longer than the standard period required for the motorcycle 100 to change lanes.

The execution unit 56 causes the motorcycle 100 to execute the adaptive cruise operation according to the control amount set by the control amount setting unit 53. Specifically, in a case where it is not determined to provide the limitation by the limitation determining unit 55 (that is, in normal case), the execution unit 56 outputs a signal corresponding to the control amount set by the control amount setting unit 53 to the behavior control mechanism 90 to travel the motorcycle 100 at the traveling speed corresponding to the control amount. In addition, in a case where it is determined to provide the limitation by the limitation determining unit 55 (that is, in a case where the motorcycle 100 travels on or in the vicinity of the lane boundaries LV_R and LV_L), the execution unit 56 prohibits the adaptive cruise operation. Alternatively, the execution unit 56 transmits a signal to the behavior control mechanism 90 such that the motorcycle 100 travels at a corrected traveling speed slower than the traveling speed when the motorcycle 100 travels with the control amount set by the control amount setting unit 53.

<Processing of Behavior Control System>

Processing of the behavior control system according to Embodiment 1 will be described.

Figure 4:
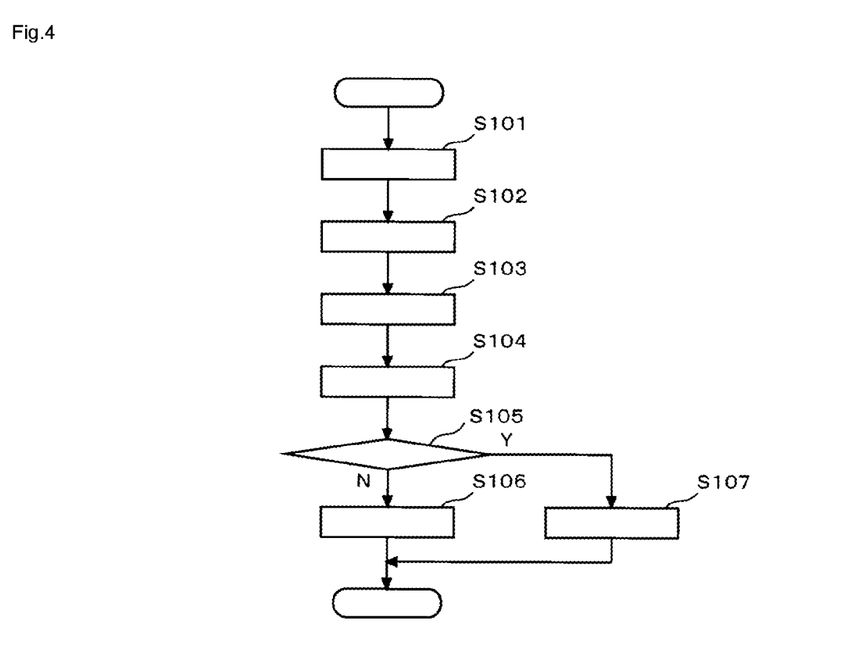
FIG. 4 is a flow chart illustrating a processing flow of the control system of the behavior control system according to Embodiment 1 of the present invention.

FIG. 4 is a flow chart illustrating a processing flow of the control system of the behavior control system according to Embodiment 1 of the present invention.

When the rider sets the adaptive cruise operation to ON, the control system 50 repeats the processing flow illustrated in FIG. 4 during traveling of the motorcycle 100.

(Tracking Target Vehicle Specifying Step)

In Step S101, the tracking target vehicle specifying unit 51 of the control system 50 specifies the tracking target vehicle, based on the output of the distance measuring sensor 10.

(Vehicle Position Information Acquiring Step)

In Step S102, the vehicle position information acquiring unit 52 of the control system 50 acquires the vehicle position information serving as the relative position information of the tracking target vehicle with respect to the motorcycle 100 during traveling.

(Control Amount Setting Step)

In Step S103, the control amount setting unit 53 of the control system 50 sets the control amount in the adaptive cruise operation, based on the vehicle position information acquired by the vehicle position information acquiring unit 52 and the output of the speed sensor 30.

(Lane Position Information Acquiring Step)

In Step S104, the lane position information acquiring unit 54 of the control system 50 acquires the lane position information serving as the relative position information of the lane boundary LV_L closest to the motorcycle 100 with respect to the motorcycle 100 during traveling, based on the output of the image sensor 20.

(Limitation Determining Step)

In Step S105, the limitation determining unit 55 of the control system 50 determines whether or not the lane position information acquired by the lane position information acquiring unit 54 satisfies the first prescribed condition, and in a case of Yes, the limitation determining unit 55 determines to provide the limitation on the adaptive cruise operation. In addition, in a case of No, the limitation determining unit 55 of the control system 50 determines not to provide the limitation on the adaptive cruise operation.

(Execution Step)

In a case where it is determined not to provide the limitation by the limitation determining unit 55, in Step S106, the execution unit 56 of the control system 50 causes the motorcycle 100 to execute the adaptive cruise operation at the traveling speed according to the control amount set by the control amount setting unit 53. In addition, in a case where it is determined to provide the limitation by the limitation determining unit 55, in Step S107, the execution unit 56 of the control system 50 prohibits the adaptive cruise operation. Alternatively, the execution unit 56 causes the motorcycle 100 to execute the adaptive cruise operation at the corrected traveling speed corrected to the traveling speed lower than that in step S106.

<Effect of Behavior Control System>

The effect of the behavior control system according to Embodiment 1 will be described.

The control system 50 is provided with the lane position information acquiring unit 54 acquiring the lane position information serving as the relative position information of the lane boundary LV_L with respect to the motorcycle 100 during traveling, and in a case where the determination reference is satisfied, the limitation determining unit 55 that determines to provide the limitation on auto cruise operation. The determination reference includes a condition that the lane position information acquired by the lane position information acquiring unit 54 satisfies the first prescribed condition. In the case where it is not determined to provide the limitation by the limitation determining unit 55, the execution unit 56 causes the motorcycle 100 to execute the auto cruise operation at the traveling speed according to the control amount set by the control amount setting unit 53. In the case where it is determined to provide the limitation by the limitation determining unit 55, the execution unit 56 prohibits the auto cruise operation, or causes the motorcycle 100 to execute the auto cruise operation at the corrected traveling speed corrected to the lower traveling speed. That is, it is possible to inhibit the auto cruise operation in a situation where the motorcycle 100 is traveling at a position unsuitable for the auto cruise operation. Therefore, it is possible to realize the appropriate auto cruise operation specialized in the motorcycle 100 having a characteristic that a degree of freedom of the traveling position is large in the width direction of the lane.

Preferably, the first prescribed condition is a condition that the lane position information acquired by the lane position information acquiring unit 54 is information indicating a state where the distance between the lane boundary LV_L closest to the motorcycle 100 and the motorcycle 100 is smaller than the reference value temporarily or over a period longer than the reference period. With such a configuration, it is possible to inhibit the rider from unnecessarily traveling the motorcycle 100 on or in the vicinity of the lane boundary LV_L, and thus the safety of the rider is improved.

In particular, the auto cruise operation executed by the execution unit 56 may be the adaptive cruise operation. For example, in the example illustrated in FIG. 3, in a case where the motorcycle 100 travels on or in the vicinity of the lane boundary LV_L, the switching between the case where the lane L1 on the right side of the lane boundary LV_L is a specific target lane of the tracking target vehicle and the case where the lane L2 on the left side of the lane boundary LV_L is a specific target lane of the tracking target vehicle is likely to occur, so that the behavior of the motorcycle 100 is likely to be unstable. In a case where the motorcycle 100 travels on or in the vicinity of the lane boundary LV_L, the behavior of the motorcycle 100 is stabilized by providing the limitation on the adaptive cruise operation, so that the safety of the rider is improved. That is, in a case where the motorcycle 100 travels on or in the vicinity of the lane boundary LV_L, the fact that the limitation is set on the adaptive cruise operation is particularly useful in a case where the auto cruise operation is the adaptive cruise operation.

Embodiment 2

Hereinafter, a behavior control system according to Embodiment 2 will be described.

The description overlapping or similar to the behavior control system according to Embodiment 1 is simplified or omitted as appropriate.

<Configuration of Behavior Control System>

The configuration of the behavior control system according to Embodiment 2 will be described.

Figure 5:
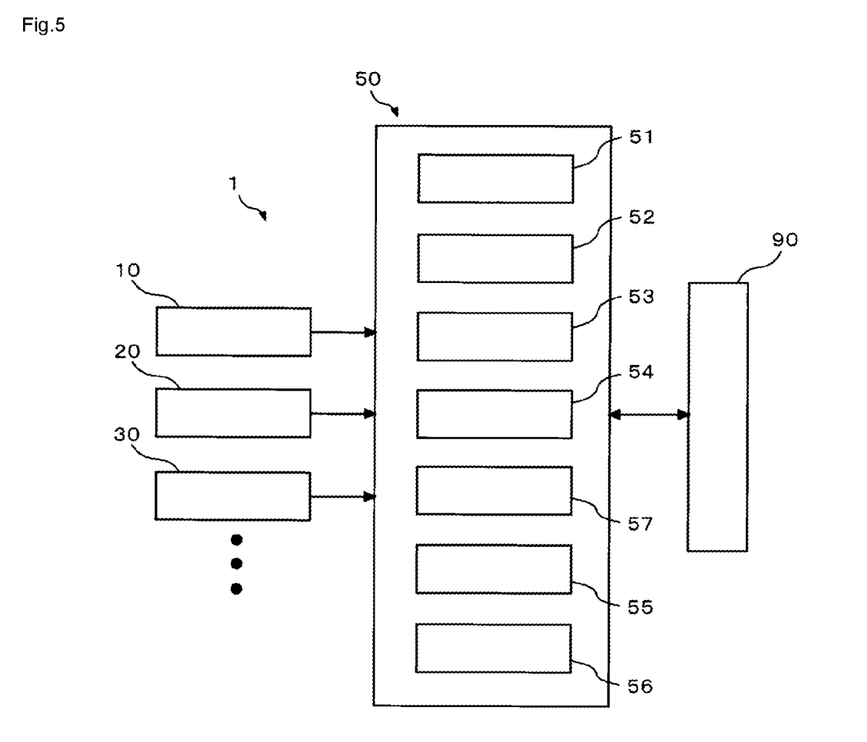
FIG. 5 is a diagram illustrating a system configuration of a behavior control system according to Embodiment 2 of the present invention.
Figure 6:
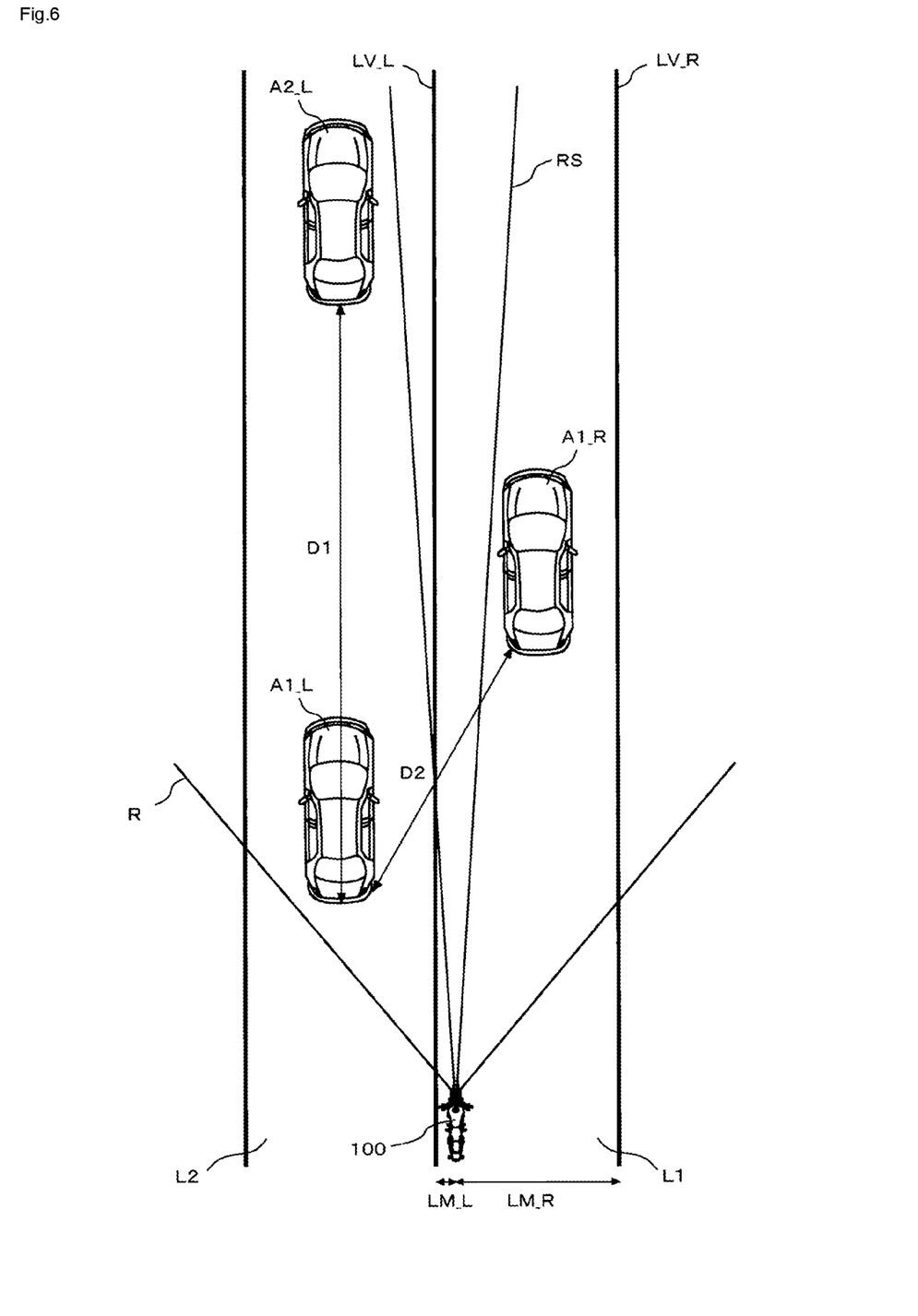
FIG. 6 is a diagram for describing processing of a control system of the behavior control system according to Embodiment 2 of the present invention.

FIG. 5 is a diagram illustrating a system configuration of a behavior control system according to Embodiment 2 of the present invention. FIG. 6 is a diagram for describing processing of a control system of the behavior control system according to Embodiment 2 of the present invention.

As illustrated in FIG. 5, the control system 50 includes the tracking target vehicle specifying unit 51, the vehicle position information acquiring unit 52, the control amount setting unit 53, the lane position information acquiring unit 54, a forward traffic information acquiring unit 57, the limitation determining unit 55, and the execution unit 56.

The forward traffic information acquiring unit 57 acquires forward traffic information serving as traffic information ahead of the motorcycle 100 (in particular, degree of congestion in the lanes L1 and L2), based on the output of the distance measuring sensor 10. Specifically, in the example illustrated in FIG. 6, the forward traffic information acquiring unit 57 acquires an interval D1 between the two preceding vehicles A1_L and A2_L traveling in the lane L2 in which the preceding vehicle travels in cascade, among the two lanes L1 and L2 extending across the lane boundary LV_L closest to the motorcycle 100, as forward traffic information. In addition, in the example illustrated in FIG. 6, the forward traffic information acquiring unit 57 acquires an interval D2 between the two preceding vehicles A1_R and A1_L that are divided and located on the two lanes L1 and L2 extending across the lane boundary LV_L closest to the motorcycle 100, as forward traffic information.

The interval D1 may be defined as the distance from the rear end of the preceding vehicle A1_L on the forward side to the rear end of the preceding vehicle A2_L on the rearward side, or may also be defined as a distance from other portion of the preceding vehicle A1_L to other portion of the preceding vehicle A2_L. In addition, the forward traffic information acquiring unit 57 may acquire other physical quantity that can be substantially converted into the interval D1 as forward traffic information. For example, the forward traffic information acquiring unit 57 may acquire other distance that can be substantially converted into the interval D1 as forward traffic information.

In addition, the interval D2 may be defined as a distance from a position closest to the motorcycle 100 of the preceding vehicle A1_R traveling on the lane L1 on the right side of the lane boundary LV_L to a position closest to the motorcycle 100 of the preceding vehicle A1_L traveling on the lane L2 on the left side of the lane boundary LV_L, or may be defined as a distance from other portion of the preceding vehicle A1_R to other portion of the preceding vehicle A1_L. In addition, the forward traffic information acquiring unit 57 may acquire other physical quantity that can be substantially converted into the interval D2 as forward traffic information. For example, the forward traffic information acquiring unit 57 may acquire other distance that can be substantially converted into the interval D2 as forward traffic information.

In addition, in the example illustrated in FIG. 6, the forward traffic information acquiring unit 57 may acquire the absolute speeds of the plurality of preceding vehicles A1_R, A1_L, and A2_L traveling on the lanes L1 and L2 as forward traffic information. For example, the forward traffic information acquiring unit 57 may acquire other physical quantity that can be substantially converted into the absolute speed as forward traffic information. In addition, the forward traffic information acquiring unit 57 may acquire the average value of the absolute speeds of the plurality of preceding vehicles A1_R, A1_L, and A2_L as forward traffic information, or may acquire each absolute speed as forward traffic information. Even with such a configuration, it is possible to estimate the degree of congestion in the lanes L1 and L2.

In addition, in the example illustrated in FIG. 6, the forward traffic information acquiring unit 57 may acquire relative speeds of the plurality of preceding vehicles A1_R, A1_L, and A2_L traveling in the lanes L1 and L2 with respect to the motorcycle 100 as forward traffic information. For example, the forward traffic information acquiring unit 57 may acquire other physical quantity that can be substantially converted into the relative speed as forward traffic information. In addition, the forward traffic information acquiring unit 57 may acquire the average value of the relative speeds of the plurality of preceding vehicles A1_R, A1_L, and A2_L as forward traffic information, or may acquire each relative speed as forward traffic information. Even with such a configuration, it is possible to estimate the degree of congestion in the lanes L1 and L2.

In a case where the determination reference is satisfied, the limitation determining unit 55 determines to provide the limitation on the adaptive cruise operation. The determination reference includes a condition that the lane position information acquired by the lane position information acquiring unit 54 satisfies the first prescribed condition and a condition that the forward traffic information acquired by the forward traffic information acquiring unit 57 satisfies the second prescribed condition.

Specifically, the first prescribed condition is a condition that the lane position information acquired by the lane position information acquiring unit 54 is information indicating a state where the lane margin LM_L is smaller than the reference value temporarily or over a period longer than the reference period.

In addition, the second prescribed condition is at least one of the condition that the forward traffic information acquired by the forward traffic information acquiring unit 57 is information indicating a state where the interval D1 between the two preceding vehicles A1_L and A2_L located on the lane L2 in which the preceding vehicle travels in cascade among the two lanes L1 and L2 is narrower than the reference interval, and the condition that the interval D2 between the two preceding vehicles A1_R and A1_L that are divided and located on the two lanes L1 and L2 is narrower than the reference interval. The reference interval for comparison with the interval D1 is set to be an interval wider than the standard interval at which lane change is likely to occur. In addition, the reference interval for comparison with the interval D2 is set to be an interval wider than the interval at which passing-through by the motorcycle 100 is difficult.

In addition, the second prescribed condition may be at least one of the condition that the forward traffic information acquired by the forward traffic information acquiring unit 57 is the information indicating a state where the absolute speeds of the plurality of preceding vehicles A1_R, A1_L, A2_L located on the two lanes L1 and L2 (average value of absolute speeds or all of each absolute speed) are slower than the reference absolute speed and the condition that the forward traffic information is the information indicating a state where the relative speeds of the plurality of preceding vehicles A1_R, A1_L, A2_L located on the two lanes L1 and L2 with respect to the motorcycle 100 (average value of relative speeds or all of each relative speed) are slower than the reference relative speed. The reference absolute speed for comparison with the absolute speed and the reference relative speed for comparison with the relative speed are set taking into consideration the standard speed at the time of non-congestion. The determination using the intervals D1 and D2 and the determination using the speed (absolute speed, relative speed) may be combined.

<Processing of Behavior Control System>

Processing of the behavior control system according to Embodiment 2 will be described.

Figure 7:
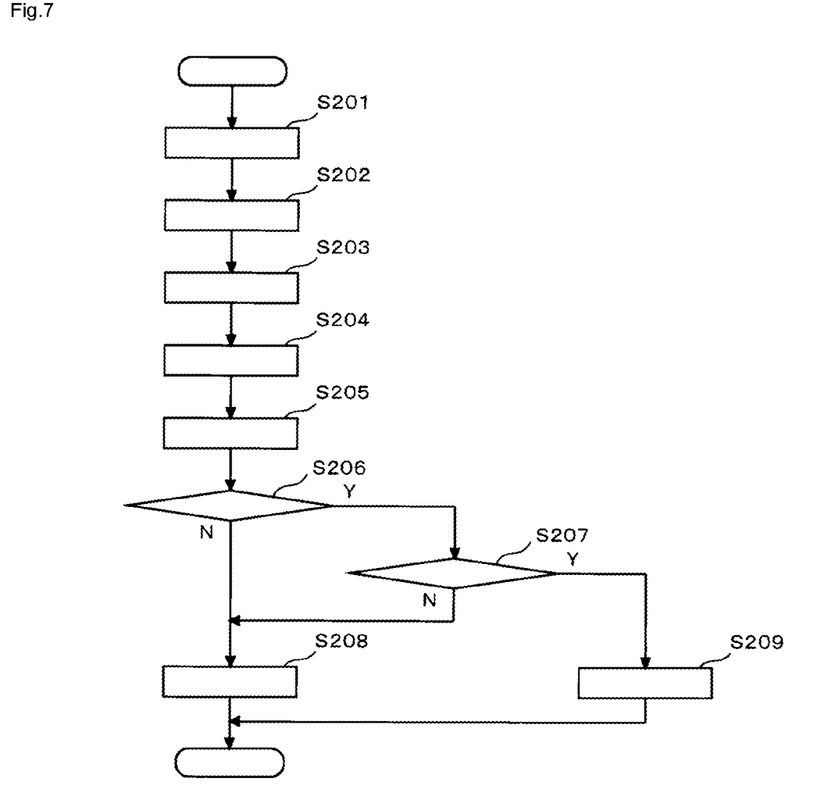
FIG. 7 is a flow chart illustrating a processing flow of the control system of the behavior control system according to Embodiment 2 of the present invention.

FIG. 7 is a flow chart illustrating a processing flow of the control system of the behavior control system according to Embodiment 2 of the present invention.

When the rider sets the adaptive cruise operation to ON, the control system 50 repeats the processing flow illustrated in FIG. 7 during traveling of the motorcycle 100. Steps S201 to S204, S208, and S209 of the processing flow illustrated in FIG. 7 are the same as the steps S101 to S104, S106, and S107 of the processing flow illustrated in FIG. 4, so that the description is omitted.

(Forward Traffic Information Acquiring Step)

In Step S205, the forward traffic information acquiring unit 57 of the control system 50 acquires forward traffic information that is traffic information ahead of the motorcycle 100 during traveling, based on the output of the distance measuring sensor 10.

(Limitation Determining Step-1)

In Step S206, the limitation determining unit 55 of the control system 50 determines whether or not the lane position information acquired by the lane position information acquiring unit 54 satisfies the first prescribed condition, and in a case of Yes, the processing proceeds to Step S207. In addition, in a case of No, the limitation determining unit 55 of the control system 50 determines not to provide the limitation on the adaptive cruise operation.

(Limitation Determining Step-2)

In Step S207, the limitation determining unit 55 of the control system 50 determines whether or not the forward traffic information acquired by the forward traffic information acquiring unit 57 satisfies the second prescribed condition, and in a case of Yes, the limitation determining unit 55 determines to provide the limitation on the adaptive cruise operation. In addition, in a case of No, the limitation determining unit 55 of the control system 50 determines not to provide the limitation on the adaptive cruise operation.

<Effect of Behavior Control System>

The effect of the behavior control system according to Embodiment 2 will be described.

Preferably, the control system 50 is provided with the forward traffic information acquiring unit 57 that acquires forward traffic information on at least one of the two lanes L1 and L2 extending across the lane boundary LV_L, in addition to the lane position information acquiring unit 54, the determination reference for determining whether or not to provide the limitation on the adaptive cruise operation includes a condition that the forward traffic information acquired by the forward traffic information acquiring unit 57 satisfies the second prescribed condition. In a case where both of the first prescribed condition and the second prescribed condition are satisfied, the limitation determining unit 55 determines to provide the limitation on the adaptive cruise operation.

For example, as in the example illustrated in FIG. 6, in a case where the fact that the tracking target vehicle is specified and the relative position information of the tracking target vehicle with respect to the motorcycle 100 is acquired is executed only on a portion of the detection range R of the detection device (for example, distance measuring sensor 10), that is, in a case where the control system 50 extracts only the preceding vehicle located on the range RS narrower than the detection range R of the detection device (for example, other distance measuring sensor 10), and executes processing for specifying the tracking target vehicle from the extracted preceding vehicles, the adaptive cruise operation is executed such that the motorcycle 100 passes through the side of the dense preceding vehicles A1_R, A1_L, and A2_L. In such a situation, there is a high possibility that the preceding vehicles A1_R, A1_L, and A2_L change lanes, and it is not desirable for the motorcycle 100 to travel at the same traveling speed as the normal adaptive cruise operation. In addition, it is highly difficult to pass through the preceding vehicles A1_R, A1_L, and A2_L, and it is not desirable for the motorcycle 100 to travel at the same traveling speed as the normal adaptive cruise operation. In a case where both the first prescribed condition and the second prescribed condition are satisfied, the limitation determining unit 55 determines to provide the limitation on the adaptive cruise operation, so that the safety of the rider in such a situation is improved.

In particular, in a case where at least one of the first prescribed condition and the second prescribed condition is not satisfied, the limitation determining unit 55 may determine not to provide the limitation. With such a configuration, for example, in a situation where the preceding vehicles are not crowded, in a situation where the motorcycle 100 is not traveling on or in the vicinity of the lane boundary LV_L, or the like, it is inhibited for the adaptive cruise operation from being unnecessarily limited, and comfort of the rider is improved.

In addition, the second prescribed condition may be a condition that the forward traffic information acquired by the forward traffic information acquiring unit 57 is information indicating a state where the interval D1 between the two preceding vehicles A1_L and A2_L located on one lane L2 of the two lanes L1 and L2 is narrower than the reference interval. With such a configuration, it is possible to accurately cope with a situation where lane change is likely to occur.

In addition, the second prescribed condition may be a condition that the forward traffic information acquired by the forward traffic information acquiring unit 57 is information indicating a state where the interval D2 between the two preceding vehicles A1_R and A1_L that are divided and located on the two lanes L1 and L2 is narrower than the reference interval. With such a configuration, it is possible to accurately cope with a situation where passing-through is difficult.

In addition, the second prescribed condition may be a condition that the forward traffic information acquired by the forward traffic information acquiring unit 57 is information indicating a state where the absolute speeds of the plurality of preceding vehicles A1_R, A1_L, and A2_L located on the two lanes L1 and L2 are slower than the reference absolute speed. With such a configuration, it is possible to accurately cope with a situation where lane change is likely to occur.

In addition, the second prescribed condition may be a condition that the forward traffic information acquired by the forward traffic information acquiring unit 57 is information indicating a state where the relative speeds of the plurality of preceding vehicles A1_R, A1_L, and A2_L located on the two lanes L1 and L2 with respect to the motorcycle 100 are slower than the reference relative speed. With such a configuration, it is possible to accurately cope with a situation where passing-through is difficult.

Hereinbefore, although Embodiment 1 and Embodiment 2 have been described, the present invention is not limited to the description of each embodiment. For example, all or a portion of each embodiment may be implemented. In addition, the order of each of the steps in the control system 50 may be exchanged.

That is, in Embodiment 1 and Embodiment 2, although the case where the image sensor 20 captures both of the lane boundary LV_R and the lane boundary LV_L is described, the image sensor 20 may capture only one of the lane boundary LV_R and the lane boundary LV_L as long as the control system 50 can acquire the width of the lane L1 on which the motorcycle 100 travels from other information source (for example, map information or the like).

In addition, in Embodiment 1, although the case where the auto cruise operation executed by the execution unit 56 is the adaptive cruise operation is described, the execution unit 56 may execute other auto cruise operation in which the traveling speed of the motorcycle 100 is controlled regardless of the distance between the motorcycle 100 and the tracking target vehicle in the traveling direction of the motorcycle 100.

In addition, in Embodiment 2, although the case in which the forward traffic information is determined after the lane position information is determined is described, the lane position information may be determined after the forward traffic information is determined.

In addition, in Embodiment 2, although the case where the forward traffic information is acquired, based on the output of the distance measuring sensor 10 is described, the forward traffic information may be acquired, based on other information sources (for example, traffic jam information or the like supplied to navigation system).

REFERENCE SIGNS LIST

1: Behavior control system
10: Distance measuring sensor
20: Image sensor
30: Speed sensor
50: Control system
51: Tracking target vehicle specifying unit
52: Vehicle position information acquiring unit
53: Control amount setting unit
54: Lane position information acquiring unit
55: Limitation determining unit
56: Execution unit
57: Forward traffic information acquiring unit
90: Behavior control mechanism
100: Motorcycle
A1_R, A1_L, A2_L: Preceding vehicle
R: Detection range
RS: Range
L1, L2: Lane LV_R, LV_L: Lane boundary
LM_R, LM_L: Lane margin
D1, D2: Interval

What is claimed is:

1. A control system (50) which controls behavior of a motorcycle (100), the system comprising:
   a control amount setting unit (53) that sets a control amount in auto cruise operation;
   an execution unit (56) that causes the motorcycle (100) to execute the auto cruise operation according to the control amount set by the control amount setting unit (53);
   a lane position information acquiring unit (54) that acquires lane position information serving as relative position information of lane boundaries with respect to the motorcycle (100) during traveling;
   a forward traffic information acquiring unit (57) that acquires forward traffic information in at least one lane of two lanes extending across the lane boundary; and
   a limitation determining unit (55) that determines to provide a limitation on the auto cruise operation in a case where both the lane position information acquired by the lane position information acquiring unit (54) satisfies a first prescribed condition, and the forward traffic information acquired by the forward traffic information acquiring unit (57) satisfies a second prescribed condition, and
   wherein the execution unit (56),
   in a case where it is not determined to provide the limitation by the limitation determining unit (55), causes the motorcycle (100) to execute the auto cruise operation at a traveling speed according to the control amount, and
   in a case where it is determined to provide the limitation by the limitation determining unit (55), prohibits the auto cruise operation, or causes the motorcycle (100) to execute the auto cruise operation at a corrected traveling speed corrected to a lower traveling speed,
   wherein the first prescribed condition is a condition that the lane position information acquired by the lane position information acquiring unit (54) is information indicating a state where a distance from the lane boundary closest to the motorcycle (100) to the motorcycle (100) is smaller than a reference value temporarily or over a period longer than a reference period,
   wherein the second prescribed condition includes a condition that the forward traffic information acquired by the forward traffic information acquiring unit (57) is information indicating a state where an interval between two preceding vehicles located on one lane of the two lanes is narrower than a reference interval.

2. The control system according to claim 1,
   wherein the auto cruise operation executed by the execution unit (56) is adaptive cruise operation.

3. The control system according to claim 2,
   wherein in a case where at least one of the first prescribed condition and the second prescribed condition is not satisfied, the limitation determining unit (55) determines not to provide the limitation.

4. A control system (50) which controls behavior of a motorcycle (100), the system comprising:
   a control amount setting unit (53) that sets a control amount in auto cruise operation;
   an execution unit (56) that causes the motorcycle (100) to execute the auto cruise operation according to the control amount set by the control amount setting unit (53);
   a lane position information acquiring unit (54) that acquires lane position information serving as relative position information of lane boundaries with respect to the motorcycle (100) during traveling;
   a forward traffic information acquiring unit (57) that acquires forward traffic information in at least one lane of two lanes extending across the lane boundary; and
   a limitation determining unit (55) that determines to provide a limitation on the auto cruise operation in a case where both the lane position information acquired by the lane position information acquiring unit (54) satisfies a first prescribed condition, and the forward traffic information acquired by the forward traffic information acquiring unit (57) satisfies a second prescribed condition,
   wherein the execution unit (56),
   in a case where it is not determined to provide the limitation by the limitation determining unit (55), causes the motorcycle (100) to execute the auto cruise operation at a traveling speed according to the control amount, and
   in a case where it is determined to provide the limitation by the limitation determining unit (55), prohibits the auto cruise operation, or causes the motorcycle (100) to execute the auto cruise operation at a corrected traveling speed corrected to a lower traveling speed,
   wherein the first prescribed condition is a condition that the lane position information acquired by the lane position information acquiring unit (54) is information indicating a state where a distance from the lane boundary closest to the motorcycle (100) to the motorcycle (100) is smaller than a reference value temporarily or over a period longer than a reference period,
   wherein the second prescribed condition includes a condition that the forward traffic information acquired by the forward traffic information acquiring unit (57) is information indicating a state where an interval between two preceding vehicles that are divided and located on the two lanes is narrower than the reference interval.

5. The control system according to claim 2, wherein the forward traffic information acquired by the forward traffic information acquiring unit (57) includes information indicating a state where absolute speeds of a plurality of preceding vehicles located on the two lanes are slower than a reference absolute speed.

6. The control system according to claim 2, wherein the forward traffic information acquired by the forward traffic information acquiring unit (57) includes information indicating a state where relative speeds of the plurality of preceding vehicles located on the two lanes with respect to the motorcycle (100) are slower than a reference relative speed.

7. The control system according to claim 2,
   wherein the forward traffic information is acquired, based on an output of a distance measuring sensor (10).

8. The control system according to claim 1,
   wherein the lane position information is acquired, based on an output of an image sensor (20).

9. A control method for controlling behavior of a motorcycle (100), the method comprising:
   a control amount setting step of setting a control amount in auto cruise operation;
   an execution step of causing the motorcycle (100) to execute the auto cruise operation according to the control amount set in the control amount setting step (S103, S203);

a lane position information acquiring step of acquiring a lane position information serving as relative position information of a lane boundary with respect to the motorcycle (100) during traveling;

a forward traffic information acquiring step of acquiring forward traffic information ahead of the motorcycle (100) during traveling; and a limitation determining step (S105, S206, S207) of determining to provide a limitation on the auto cruise operation in a case where both the lane position information acquired in the lane position information acquiring step (S104, S204) satisfies a first prescribed condition, and the forward traffic information acquired by the forward traffic information acquiring unit (57) satisfies a second prescribed condition, and in the execution step (S106, S208), in a case where it is not determined to provide the limitation in the limitation determining step (S105, S206, S207), the auto cruise operation in the motorcycle (100) is executed at a traveling speed corresponding to the control amount, and in a case where it is determined to provide the limitation in the limitation determining step (S105, S206, S207), the auto cruise operation is prohibited or the auto cruise operation in the motorcycle (100) is executed at a corrected traveling speed corrected to a lower traveling speed, wherein the first prescribed condition is a condition that the lane position information acquired by the lane position information acquiring unit (54) is information indicating a state where a distance from the lane boundary closest to the motorcycle (100) to the motorcycle (100) is smaller than a reference value temporarily or over a period longer than a reference period, wherein the second prescribed condition includes a condition that the forward traffic information acquired by the forward traffic information acquiring unit (57) is information indicating a state where an interval between two preceding vehicles located on one lane of the two lanes is narrower than a reference interval.

10. The method according to claim 9, wherein the forward traffic information is acquired, based on an output of a distance measuring sensor (10).

11. The method according to claim 9, wherein the lane position information is acquired, based on an output of an image sensor (20).

12. The control system according to claim 4, wherein the auto cruise operation executed by the execution unit (56) is adaptive cruise operation.

13. The control system according to claim 12, wherein in a case where at least one of the first prescribed condition and the second prescribed condition is not satisfied, the limitation determining unit (55) determines not to provide the limitation.

14. The control system according to claim 13, wherein the forward traffic information is acquired, based on an output of a distance measuring sensor (10).

15. The control system according to claim 13, wherein the lane position information is acquired, based on an output of an image sensor (20).

16. The control system according to claim 4, wherein the lane position information is acquired, based on an output of an image sensor (20).

17. The control system according to claim 4, wherein the forward traffic information is acquired, based on an output of a distance measuring sensor (10).

\* \* \* \* \*